UNITED STATES PATENT OFFICE.

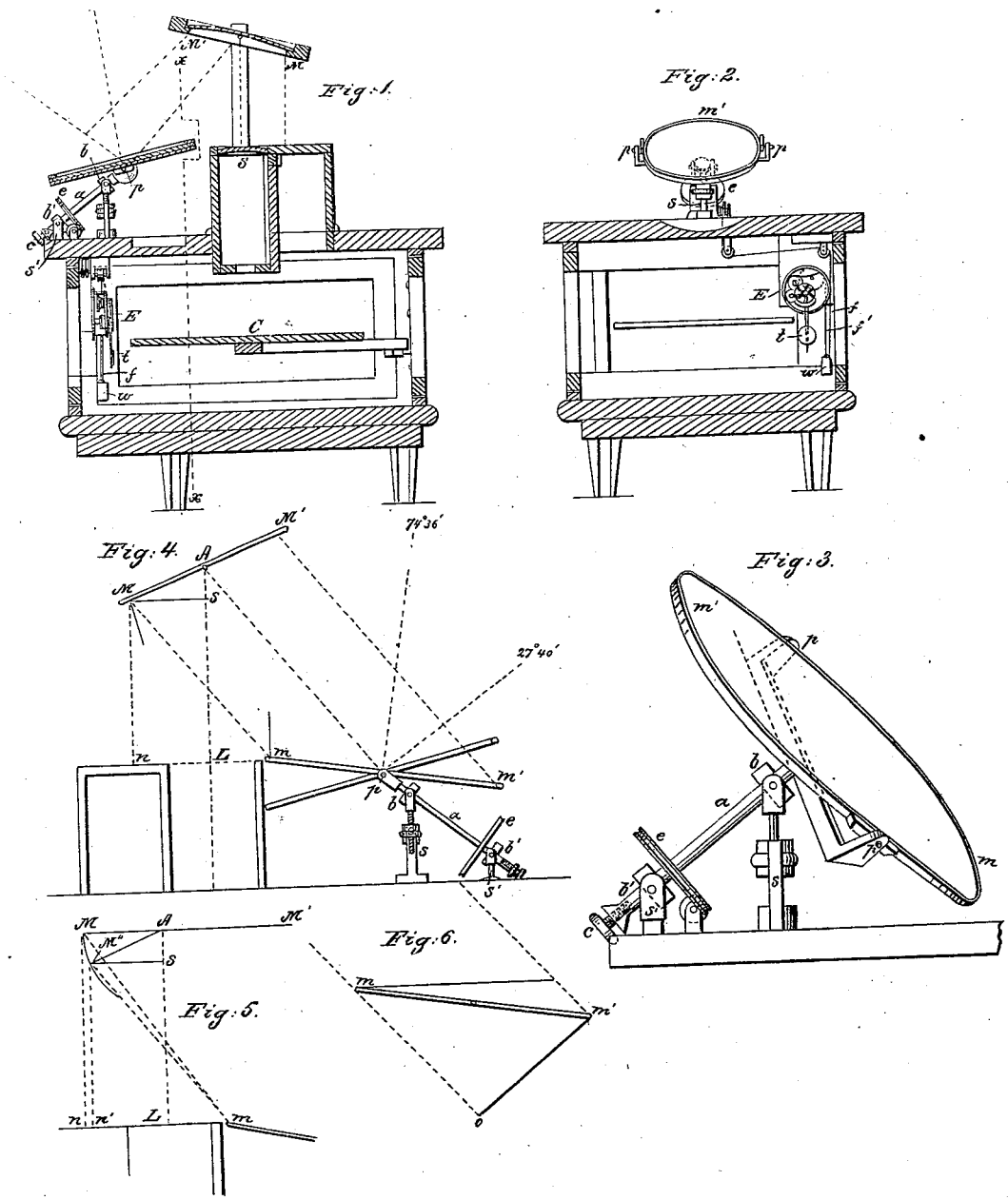

L. F. MORAWETZ, OF BALTIMORE, MARYLAND.

VERTICAL SOLAR CAMERA.

Specification forming part of Letters Patent No. 59,488, dated November 6, 1866.

*To all whom it may concern:*

Be it known that I, L. F. MORAWETZ, of the city and county of Baltimore, in the State of Maryland, have invented a Vertical Solar Camera; and I do hereby declare that the following is a full, clear, and exact description thereof, reference being had to the accompanying drawings, making a part of this specification, in which—

Figure 1 is a longitudinal section taken in a vertical plane through the center of the camera. Fig. 2 is a cross-section through the camera, taken in the vertical plane indicated by red line $x\ x$ in Fig. 1. Fig. 3 is an enlarged elevation of the movable mirror and its standards. Figs. 4, 5, and 6 are diagrams for illustrating the manner of adjusting the mirrors and lens.

Similar letters of reference indicate corresponding parts in the several figures.

This invention relates to an improvement in the construction of solar cameras by which the rays of the sun are reflected in a vertical direction upon the horizontal lenses of the solar microscope, or megaloscope, and the pictures are received upon a horizontal table either with the amount of light commensurate to the diameter of the lens, or with increased light, by means of mirrors, of which one is moved automatically in a plane at the required inclination to the place of the daily course of the sun, for purposes where the sun's light, either simple or intensified, is required for copying or amplifying photographic or other transparent pictures or objects, as may be required by photographers, artists, engravers, draftsmen, and others.

To enable others skilled in the art to understand my invention, I will describe its construction and operation.

In the top of a suitable box, or in the ceiling of a room, the solar microscope S is vertically inserted. The plane or, as the case may be, concave mirror M M' above it has a fixed inclination toward the horizon, and receives the rays of the sun from the plane mirror $m\ m'$, which rays are thrown upon the microscope, as indicated by the dotted red lines in Fig. 1.

This second mirror $m\ m'$ is applied by the pivots $p\ p$ upon the revolving shaft $a$, which has an inclination parallel to the axis of the earth, and is supported by the standards $s$ and $s'$. These standards can be made higher or lower by means of suitable adjusting devices. The disks $b\ b$, which form the supports for the shaft $a$, turn upon pivots between the upper forked ends of said standards, which allows of their accommodating themselves to every inclination which it may be desired to give the shaft or axis $a$. The adjusting-screw $c$, at the lower extremity of the shaft $a$, forms a step for the latter, and serves, in conjunction with the adjusting devices of the standards $s\ s'$, to give the desired inclination and position to the shaft $a$.

By means of the pivots $p\ p$ at the sides of the mirror $m\ m'$ this mirror can be adjusted at any required inclination according to the changes required by the daily variation of the sun's altitude. This mirror can be established at any desired inclination by means of a slotted sector and set-screw, or in any other suitable manner.

The driving-wheel $e$ on the inclined mirror-shaft $a$ is acted upon by the weight W, fastened to the cord $f$, which, after passing around the rim of said wheel, passes through the ceiling to the inside of the room or box; and the descent of this weight is regulated by the escapement E, shown in Figs. 1 and 2, with which it is connected by the cord $f'$.

The inclination of the mirror M M' is so calculated that the reflected rays from it must fall perpendicularly upon the lens below it, and if a concave mirror is used the axis of the cone of light reflected from it must fall in the line of the optical axis of the system of lenses constituting the solar microscope. This requires an unchangeable angle of incidence of the rays of light coming from the revolving mirror $m\ m'$; but as this mirror is mounted upon an automatic heliotrope it forms in conjunction with it an automatic heliostat, by which the rays of the sun are unerringly reflected during the whole day with the same angle as given by adjustment.

Close to the back of the box containing the microscope, and opposite the revolving mirror, a hole is cut of sufficient size in the ceiling of the room or box, and to prevent the light from entering the camera it is covered by a continuation of the box for the microscope. The doors in the sides of the box opening on the platform admit of communication with the microscope from above, and the opening which is through the top of the box admits of communication with the microscope from below, as shown in Fig. 1. The paper for the reception of the amplified pictures is spread upon a horizontal table, C, below the microscope, which table can be raised or lowered by means suitably adapted to the purpose.

The box forming the camera of portable instruments is constructed with doors on every side, as shown in Figs. 1 and 2, which affords access to the table C from all directions.

Having described the several parts composing the improved instrument, I will now proceed to describe the manner of constructing such parts and arranging them in proper relation to each other.

*The Solar Microscope.*—The system of lenses used for the solar microscope is the same as has been used before my invention, the diameter of the upper lens determining all other values of measure in constructing this instrument, as will become apparent hereinafter.

For instruments of small size care must be taken not to select lenses of very short focal distance if they are to be used in connection with a concave mirror, as this mirror will have the effect of shortening the focus; the space between the lenses in the microscope might become too small for conveniently adjusting the negative photograph which is applied for amplification. In some cases, where the amplification of a picture is not so much a desideratum as the intensity of light, this upper lens may be removed.

*The Fixed Mirror.*—If a plane mirror be applied the construction is very simple. As the rays reflected from it are all parallel it will only be necessary to make it large enough to illuminate the whole surface of the lens S. The diameter of the lens will be equal to the cosine of the angle of dip of the mirror, and, therefore, we have: Length of mirror=

$$\frac{\text{diameter of lens} \times \sin. R}{\cos. \text{angle of dip.}}$$

The width of the mirror=diameter of lens. The distance of the mirror from the lens will determine the value of dip. As the reflected rays are required to fall perpendicularly upon the lens, it follows, by the law of reflection, that the angle of dip must be equal to half the angle formed by the incident and reflected rays; and as the rays coming from the point $m$ of the revolving mirror (see Fig. 1) will have to be so much more oblique the nearer the fixed mirror is to the lens, the angle formed by the incident and reflected rays will be so much greater, and consequently a greater dip of the mirror will be required. As no other consideration enters this construction it will be optional at what distance a plane mirror is placed above the lens. But if a concave mirror is required for the purpose of increasing the light thrown upon the lens the construction becomes more complicated. The size of this mirror will be determined by the quantity of light which it is desired to throw upon the lens and by the value of the angle of dip the mirror assumes to the horizon. If the diameter of the lens be taken as one, (1,) then the exponent of the quantity of light desired will be in the ratio of the cosine of the angle of dip, of which the required diameter of the mirror will be= radius. Therefore, assuming, for instance, the quantity of light to be double, and the dip of the mirror to be twelve degrees, then the diameter of the mirror$=\dfrac{2=\sin. R}{\cos. 12°.}$ The rays reflected by the mirror from a cone of which the base in the level of the lowest point of the mirror is an ellipsis the short diameter of which has the length of cosine dip of mirror + two sines of same angle of the versed sine of half the angle of its aperture. If the angle of dip $= n$ and the length of versed sine of half angle of aperture $= v$, then the base $=$ diameter of mirror $\dfrac{\cos. n}{\sin. R} - 2$ $\dfrac{v. \cos. n}{\sin. R}$. The height of this cone will be the distance of this base from the focus. That part of the cone where the short diameter is equal to the diameter of the lens will be the most advantageous place to be directed upon the lens, and therefore the size of the lens will influence its distance from the apex of the mirror. But at the same time the distance of the mirror and its dip is influenced by the direction of the rays coming from the revolving mirror, as above shown in the case of plane mirrors.

In Fig. 4, let M M' be the concave mirror. The line M $m$ will represent a ray of light coming from the revolving mirror, passing clear of the edge of the microscope-box, and striking the lowest point of the concave mirror. Then the vertical line M $n$ (omitting for the present the effects of the concavity) will represent the reflected ray, as it is made parallel to line A L. As the length of A L is = foc. − $\dfrac{\text{foc. diam. lens}}{\text{diam. mirror}}$ and $n$ $m$ = half diameter of the mirror + L $m$, which is = half the diameter of lens + a certain length to be allowed for the thickness of the box and width of rim of revolving mirror, the value of the angle at M can be found, one-half of which will be the presumed angle of dip. Now, constructing this angle of dip, preserving the given distance of the apex, and bringing the new values in account, viz., instead of M $n$, we substitute M $n$ − A $s$, which is the whole distance M $n$ − sine of dip, and instead of $n$ $m$ be taken $n'$ L + L $m$, which is half the length of the cosine of dip + L $m$, we will be able to find the value of the angle $m$ M'' $n'$. By comparing the value of the angles thus formed, it will be seen that the constructed angle of dip is greater than one-half the angle formed by incident and reflected rays. If the difference is small we may remove the point $m$ so far from $n'$ that $n'$ $m$ will be exactly the sine of an angle which is twice as great as the constructed angle of dip. But if the difference be so great that it produces a sensible effect upon the reflected quantity of light, it will be advisable to deduct this difference from the assumed angle of dip and repeat the calculation in the above manner. The effect of difference of focal distance upon the first position of the lens within the cone of light is so small a fraction that it may be left out of the calculation without palpable error.

In the opposite case, where the mirror of given diameter has to receive a curve, as demanded by the distance from the lens, this distance will be determined by the angle of dip which is intended to be given to the mirror. As the length of M A and the angle of dip is given, the cosine M $s$ is determined, and also A $s$ = sine of this angle, and as $m$ M″ $n'$ is to be made = 2 angle of dip, then M″ $n'$ = $n'$ $m$ $\frac{\cos. 2 \text{ angle of dip}}{s.\ m.\ 2 \text{ angle of dip}}$, in which expression $n'$ $m$ = cos. angle of dip of M A + L $m$ = M″ $o$ + L $m$.

In the horizontal position of the mirror, and assuming the rays striking it in the direction of L A, the focus will be L + $x$, and the value of $x$, the distance of the lens from the focus, can be found by the proportion — mirror : lens = A L + $x$ : $x$ =. But according to the law of reflection focus = $\frac{\text{sine of angle of dip}}{\text{sin. 2 angle of dip}}$ × radius, where the value of rad. = $2\sqrt{(A L + x)^2 + M A^2}$ has been found before. The dip of the mirror will change the distance of focus from the apex, but without sensibly affecting the distance of the lens from the apex, provided the dip and aperture of the mirror is kept within the limits drawn by the effect of spherical aberration. But a correction of the position of lens in the horizontal direction might have to be made, to effect which the center of the lens will have to be moved toward the point $n$, the length of the sine of dip of versed sine of the mirror corresponding to the change of the apex of the mirror. This correction is made without changing the position of the points $m$ and $n$, and will have no influence upon the calculation.

In the United States the size of the fixed mirror will not be required to be so large as to interfere with the rays of the sun falling upon the revolving mirror, and the point $m$ may be brought as near the lens as can be conveniently done, thereby making the angle which the ray reflected from this point forms with the level of the lens as large as possible. Within the tropics, where the sun stands vertically over the instrument, and even north of it, the point $m$ will have to be removed to such a distance from the lens that it can be reached by the rays of the sun.

*The Revolving Mirror.*—This mirror has always a plane reflecting surface. The position of the point $m$ is given by the foregoing calculations. The sun's rays will strike this point at a different angle with each change of declination. The smallest angle of incidence will be found at the time of winter solstice, when the sun is lowest, and when the angle formed by the incident ray and the required direction of the reflected ray will be equal to the latitude of the place + 23° 28′ and the angle formed by the incident and reflected rays on the fixed mirror. This becomes apparent by letting fall a perpendicular upon the horizontal line $n$ $m$ at the point $m$. Then the angle formed by this line with the direction of the reflected ray $m$ M will be equal to the angle $m$ M $n$, and the latitude of the place + 23° 28′ will be the complement of the sun's altitude. The sum of these angles divided by two will give the value of the angle of inclination and the direction of the vertical drawn upon the surface of the mirror, and therefore the inclination (dip) required to throw the light in the direction of M $m$ can be found. The difference between the angle $m$ M $n$ and the angle $m$ M $n$ + latitude + 23° declination of the sun will be = + angle of dip of this mirror. The value will be positive if the angle $m$ M $n$ is smaller, and negative if it is greater, than the other expression. As the rays reflected by this revolving mirror are parallel, and the column of light by it has to illuminate the whole surface of the fixed mirror, its width will be equal to the diameter of the fixed mirror, and its length must reach from the marginal rays $m$ M to the parallel drawn to it from the other extremity of the diameter of M M′.

By constructing a perpendicular from one end of the mirrors $m$ $m'$, upon the elongation of the parallel ray reflected from the other end, we get the right-angle triangle $m$ $o$ $m'$, of which $m'$ $o$ = length of cosine angle of dip of the fixed mirror, and the angle $m$ $m'$ $o$ = cosine of the angle $m$ M $n$ — calculated angle of dip of this revolving mirror, from which the hypotenuse or required length of the mirror can be found.

The altitude of the sun increases from winter to summer solstice nearly 47°. Consequently the inclination of the mirror must be changed accordingly to reflect the sun's rays constantly in the direction required for the fixed dip of the concave mirror, and in this given inclination it has to follow the sun's daily course. To effect this latter object the mirror $m$ $m'$ is mounted upon the automatic heliotrope, (patented June 12, 1866,) in conjunction with which it forms an automatic heliostat.

The size of this heliostat and its position required for the present purpose will be now explained. As the mirror has to be supported in the center, the points where the pivots are attached must be in a line dividing the mirror in two equal parts. The center of the mirror will be below or above the level of the lens, as circumstances may require. This distance may be found by finding the length of the sine of the angle of dip, half the length of the mirror being = radius. The distance of this center from the box containing the lens will be equal to the cosine of the same angle + the distance of point *m* by construction. Taking the length of the axis between the pivots of the mirror and the pivots of the movable disk of the lowest stand as radius for computing the length of the sine and cosine of latitude, we can readily construct the height and distance of this stand. The first or highest stand is then adjusted between these points, and the position of the axis secured. The adjustment of the axis to the required position can be made very perfect by means of the screws at *s* and *s'* and the screw *c*.

In explaining the principle of computation for construction, a certain latitude was assumed, and the size of the revolving mirror found by calculation gives the smallest dimensions required for this latitude; but unavoidable unexactness of workmanship, error of eccentricity in mounting the mirror upon the heliotrope, make it desirable that the mirror should be somewhat larger than is required by calculation. It will, therefore, be advisable to calculate the length of this mirror at least for the forty-fifth degree of latitude, which will make the same instrument available in nearly every town of notable size in the United States.

To change the position of the heliotrope for another latitude, take the distance of the verticals drawn through the centers of the pivots of the mirror and those of the disk of the second stand as the length of the cosine of latitude, calculate with it the length of sine, and deduct this from the height of the center of the pivots of the mirror when a line drawn through both is exactly horizontal; make the shortest stand exactly as high as this difference, at the same time keeping the pivots of the mirror immovable in their position; then adjust the first stand to the new position of the axis. If then the distance of the pivots from each other will agree with the length of radius calculated for the above cosine of this latitude, it will be a proof of the correctness of the given position.

*Adjustment of the instrument.*—In preparing the movable instrument for use it must first be brought exactly in the direction of the true meridian, with the revolving mirror toward the south; then it must be leveled by means of screws attached to the legs of the stand under the box or camera. This will not be necessary with instruments which are fixed on top of a room, as their direction remains permanent after once being brought to the proper position. When this has been done the mirror is turned on its pivots and axis till the cone or column of light falls perpendicularly upon the lenses, and through them upon the table below. The cord $f'$, which passes around the driving-wheel of the escapement is then fastened to the weight W, serving to move both the axis of the heliostat and the escapement. The pendulum $t$ is now put in motion, and the instrument will be ready for use.

Instead of the microscope a megaloscope may be used, without in any manner changing the principle of my invention.

Having thus described my invention, what I claim as new, and desire to secure by Letters Patent, is—

1. An automatic heliostat, which is constructed with a reflector that is mounted upon an automatic heliotrope, and moved by it synchronic with the sun, and in a required angle with the plane of the daily course of the sun, for the purpose of reflecting the sun's rays continually every day of the year upon a fixed place of the instrument, in such manner that the reflected rays shall fall with the same angle of incidence upon the surface of that place, substantially as described.

2. The combination of a concave mirror, M M', with a solar microscope or megaloscope and camera, in such manner as to reflect an increased amount of light upon the system of lenses constituting the solar microscope or megaloscope, substantially as described.

3. The combination of two mirrors, both plane, or one plane and the other concave, with a solar microscope or megaloscope and camera, arranged so as to operate substantially as and for the purposes described.

4. The combination of the movable mirror *m m'*, the fixed mirror M M', with a solar microscope or megaloscope, and a horizontal table, C, arranged beneath the same, substantially as described.

L. F. MORAWETZ, M. D.

Witnesses:
  F. RAINE,
  F. PALMYER.